United States Patent

Auracher

[11] 3,964,819
[45] June 22, 1976

[54] INTEGRATED OPTICAL MODULATOR

[75] Inventor: Franz Auracher, Munich, Germany

[73] Assignee: Siemens Aktiengesellschaft, Berlin & Munich, Germany

[22] Filed: May 1, 1975

[21] Appl. No.: 573,439

[30] Foreign Application Priority Data

May 9, 1974 Germany............................ 2422401

[52] U.S. Cl. ......................... 350/96 WG; 350/96 C; 350/160 R
[51] Int. Cl.² .......................................... G02B 5/14
[58] Field of Search ......... 350/96 WG, 96 C, 160 R

[56] References Cited
UNITED STATES PATENTS

| | | | |
|---|---|---|---|
| 3,529,205 | 9/1970 | Miller | 350/96 WG |
| 3,874,782 | 4/1975 | Schmidt | 350/96 WG |
| 3,877,781 | 4/1975 | Kaminow | 350/96 WG |

*Primary Examiner*—John K. Corbin
*Assistant Examiner*—Stewart Levy
*Attorney, Agent, or Firm*—Hill, Gross, Simpson, Van Santen, Steadman, Chiara & Simpson

[57] ABSTRACT

An integrated optical modulator for modulating optical signals in dielectric wave guides with the modulator having a substrate with two wave guides on a surface thereof extending in parallel spaced relationship with each other and including three parallel extending electrodes arranged on the surface of the substrate to apply a voltage to the two wave guides characterized by the modulator including two additional short couplers in the form of short coupling wave guides with the short couplers being spaced from one another on the wave guides and extending at right angles thereto, the couplers being separated from the said two wave guides by a dielectric low loss film.

2 Claims, 2 Drawing Figures

INTEGRATED OPTICAL MODULATOR

BACKGROUND OF THE INVENTION

1. Field of the Invention

The present invention is directed to an integrated optical modulator for modulating optical signals in dielectric wave guides which are disposed on a substrate and with at least one of the wave guides consisting of electro-optical material whose propagation constant is changeable by an application of an electrical potential to electrodes disposed on the substrate.

2. Prior Art

Integrated optical modulators which have a pair of wave guides disposed on a surface of the substrate with at least one of the wave guides being of an electro-optical material whose propagation constant is varied by the application of electrical field produced by applying electrical voltages to electrodes on the substrate have been suggested. In my copending U.S. patent application entitled "An Integrated Optical Modulator", Ser. No. 573,553, filed May 1, 1975 (corresponding to German Application No. P 24 21 285.9, filed May 2, 1974), I disclosed an electro-optical amplitude modulator having a pair of parallel extending wave guides which were positioned either above or below a wide third coupling wave guide and separated therefrom by a thin, low loss dielectric film having an index of refraction $n_3$ which was less than the index of refraction $n_2$, $n_4$, of the two parallel extending wave guides. Since the thickness of the film can be accurately controlled, it was possible to maintain the spacing between the two wave guides and therefore keep the tolerance of the coupling strength in a very narrow range.

This arrangement also offers the advantage that when the two parallel wave guides were disposed beneath the wide coupling or third wave guide, they could be produced in one operation from the same material which enabled the achievement of a good phase matching between the two wave guides. While the value obtained by the equation $$\frac{\Delta\beta}{2c} = \frac{\beta_o - \beta_u}{2c}$$

(where $\beta_o$ and $\beta_u$ are propagation constants of the upper wave guide and lower wave guides, which lower wave guides are assumed to be identical, and $c$ is the coupling strength) is still involved in the transmission from the first wave guide to the second wave guide, the theory of the three coupled wave guides shows that the reduction in the transmission with the increasing of $$\left|\frac{\Delta\beta}{2c}\right|$$

is considerably slower than for two coupled wave guides. Therefore, it is considerably easier to adhere to the required tolerances for the modulator with the improved structure.

A further possibility for an optical modulator consists in carrying out the coupling and the electro-optical phase modulations both spatially and consecutively in the two coupled wave guides.

SUMMARY OF THE INVENTION

The present invention is directed to providing an improved integrated optical modulator for the modulation of optical signals which modulator has a greater permissible tolerance for the propagation constants and which modulator also enables the coupling strength and the length of the phase modulator to be selected to be independent of each other.

To accomplish these aims, the integrated optical modulator of the present invention includes an improvement in a modulator having a substrate with the surface supporting two parallel extending wave guides with two of the wave guides extending in parallel spaced relationship with each other and having their upper and lower surfaces being in pairs of co-planar surfaces and includes three parallel extending electrodes supported on the surface of the substrate with electrodes adjacent each edge of the two wave guides and extending parallel thereto. The improvement comprises the modulator including two additional short couplers, said short couplers being wide coupling wave guides and being spaced from one another on said two parallel wave guides and extending at right angles thereto. Advantageously, both short couplers are 3dB couplers so that the first coupler uniformly distributes the optical power between the two parallel wave guides while the second coupler reunites the waves and causes them to interfere with one another.

DESCRIPTION OF THE PREFERRED EMBODIMENT

Figure 1:
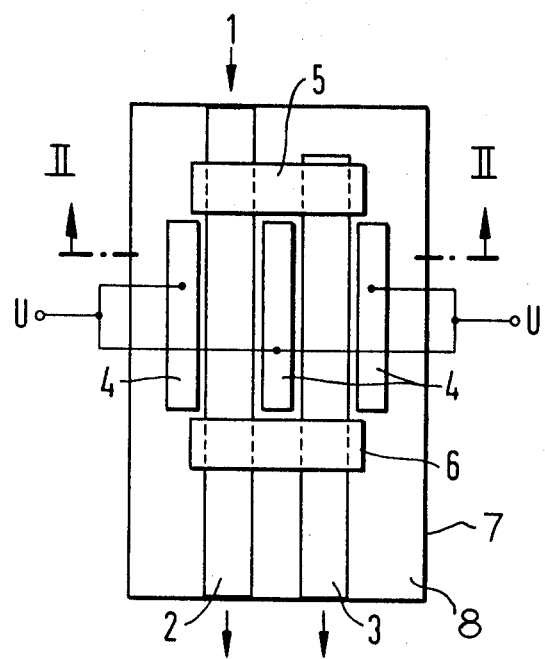
FIG. 1 is a plan view of the improved integrated optical modulator of the present invention.
Figure 2:
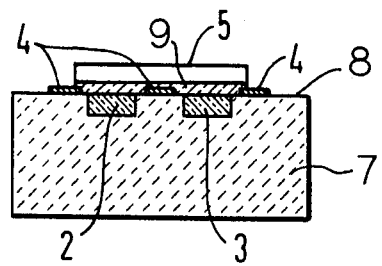
FIG. 2 is a cross-sectional view taken along lines II—II of FIG. 1.

The principles of the present invention are particularly useful in an integrated optical modulator illustrated in FIGS. 1 and 2. The modulator has a substrate 7 with an upper surface 8 with a pair of parallel extending wave guides 2 and 3 disposed on the surface 8. As illustrated, the wave guides 2 and 3 have a rectangular cross section and are embedded in the substrate 7 with their upper surfaces being substantially co-planar with each other and with the surface 8. Three parallel extending electrodes 4 are disposed on the surface 8 and extend parallel to each of the edges of the two wave guides 2 and 3 so that each of the wave guides 2 and 3 extends between a pair of the electrodes 4. Each of the electrodes 4 is connected to an electrical source with the center electrode disposed between the two wave guides 2 and 3 having a polarity opposite to the outer two electrodes. A thin, low loss dielectric layer or film 9 covers the wave guides 2 and 3 and has a width greater than the sum of the widths of the two wave guides 2 and 3 and the spacing therebetween. The dielectric film 9 separates wave guides 2 and 3 from the couplers 5 and 6 which are wide coupling wave guides having widths substantially equal to the sum of the widths of the wave guides 2 and 3 plus the spacing therebetween.

It should be pointed out that the structure of the modulator disclosed hereinabove is similar to one of the embodiments described in my above mentioned copending application, the wide coupling wave guides 5 and 6 corresponding to the third wave guide of the above mentioned copending application. If desired, the two wave guides 2 and 3 can be disposed on a top surface of the wide or coupling wave guides 5 and 6 with the film 9 interposed therebetween.

In accordance with the present invention, the coupling wave guide 5 is a short 3dB coupler positioned perpendicular or at right angles to the two wave guides 2 and 3. Spaced from the coupler 5 is the second coupling wave guide 6, which is also a short 3dB coupler and extends perpendicular or at right angles to the two wave guides 2 and 3. The first 3dB coupler 5 serves to uniformly distribute the optical power of an input light 1 between the two wave guides 2 and 3. Then using the electro-optical effect over a path of a suitable length, which is determined by the length of the electrodes 4, the light waves propagating in the two wave guides 2 and 3 will have a phase difference and are reunited by the second 3dB coupler 6 with a resulting interference with each other. With regard to the couplers, the coupling strength c can be selected to be great so that the coupling length can be selected to be short. This also enables the permissible tolerance $|\Delta\beta|$, which is the difference in the propagation constants between the coupling wave guides 5 or 6 and the wave guides 2 or 3 to be equally high. The length of the wave guides in which the electro-optical phase modulation is produced can now be selected independently of the coupling length.

The proposed modulator thus permits even greater tolerance in the propagation constants $\beta_o$, $\beta_u$ and at the same time both coupling strength and the symmetry of the two parallel wave guides can be kept within narrow low tolerances. Also, the perfect symmetry leads to outstanding temperature stability for the modulator.

Although minor modifications may be suggested by those versed in the art, it should be understood that I wish to employ within the scope of the patent granted hereon, all such modifications as reasonably and properly come within the scope of my contribution to the art.

I claim:

1. In an integrated optical modulator for modulating optical signals in dielectric wave guides, said modulator having a substrate with a surface supporting two wave guides extending in parallel spaced relationship with each other and having their upper and lower surfaces being a pair of co-planar surfaces, said modulator including three parallel extending electrodes supported on the surface of the substrate with an electrode adjacent each edge of the two wave guides, and extending parallel thereto, the improvement comprising the modulator including two short couplers, said short couplers being short coupling wave guides and being spaced from one another on said parallel wave guides and extending at right angles thereto and being separated from the said parallel wave guides by a dielectric low loss film.

2. In an integrated optical modulator according to claim 1, wherein each of the short couplers is a 3dB coupler, so that the first of the two couplers uniformly distribute the optical power between the two wave guides and the second of the two couplers reunites the waves and causes them to interfere with one another.

* * * * *